No. 649,037. Patented May 8, 1900.
A. ASSMANN.
WIND SCREEN FOR BICYCLES.
(Application filed Apr. 27, 1899.)
(No Model.) 2 Sheets—Sheet 1.

Witnesses:

Inventor:

No. 649,037. Patented May 8, 1900.
A. ASSMANN.
WIND SCREEN FOR BICYCLES.
(Application filed Apr. 27, 1899.)
(No Model.) 2 Sheets—Sheet 2.

Witnesses:
Henry Drury
R. M. Kelly

Inventor:
August Assmann
By his atty

THE NORRIS PETERS CO., PHOTO-LITHO., WASHINGTON, D. C.

UNITED STATES PATENT OFFICE.

AUGUST ASSMANN, OF BRESLAU, GERMANY.

WIND-SCREEN FOR BICYCLES.

SPECIFICATION forming part of Letters Patent No. 649,037, dated May 8, 1900.

Application filed April 27, 1899. Serial No. 714,695. (No model.)

*To all whom it may concern:*

Be it known that I, AUGUST ASSMANN, a subject of the King of Prussia, Emperor of Germany, residing at Breslau, in the Kingdom of Prussia, Germany, have invented certain new and useful Improvements in Wind-Screens for Cyclists, (for which I have applied for patents in England, dated March 22, 1899, No. 6,216; in Germany, dated March 9, 1899; in Austria, dated March 14, 1899; in Hungary, dated March 14, 1899, No. 3,689; in France, dated March 20, 1899, No. 274,915, and in Belgium, dated March 20, 1899, No. 111,047,) of which the following is a specification.

It is one object of my invention to provide a wind-screen for bicycles adapted to deflect the wind from the rider and afford a protection against insects, &c.

It is also an object of my invention to enable such a screen to be easily opened or closed and to be readily applied to or detached from the frame of the machine.

It is also an object of my invention to so construct such a screen that it shall not obstruct the free vision of the rider.

Figure 1:
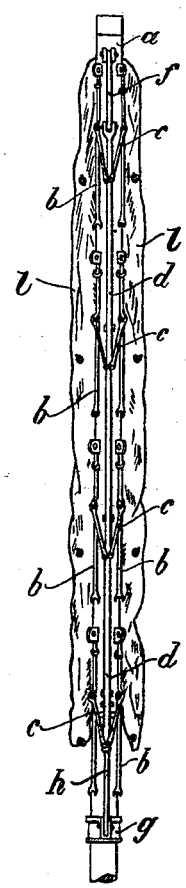
Figure 2:
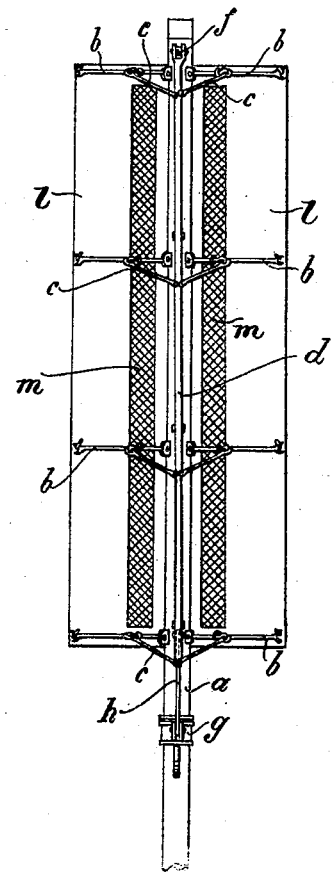
Figure 3:
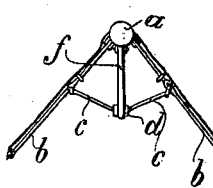
Figure 7:
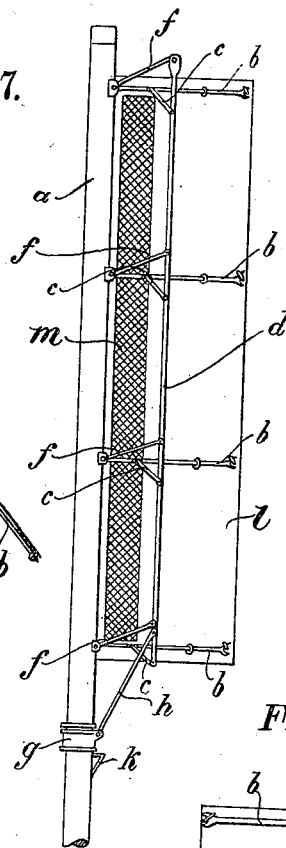
Figure 6:
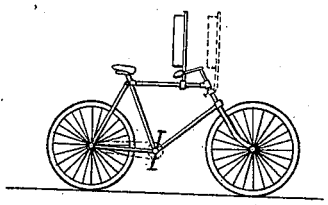
Figure 4:
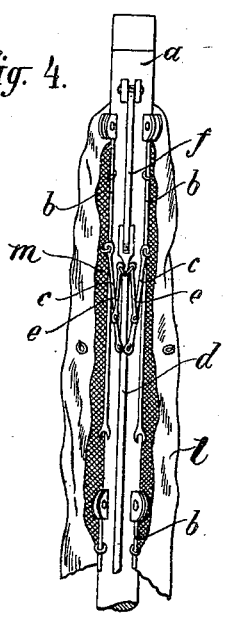
Figure 5:
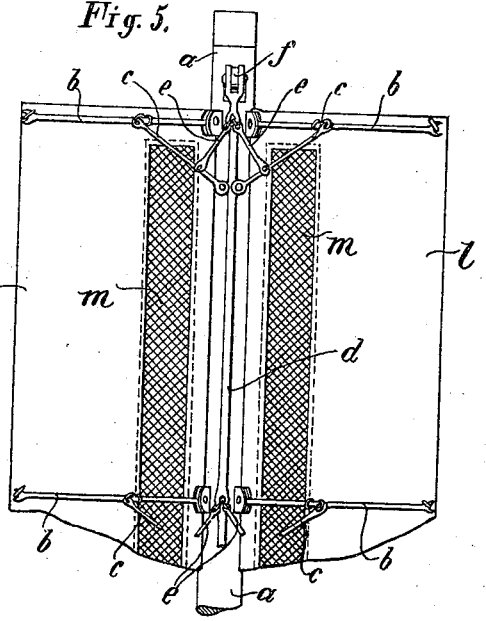

In the accompanying drawings, Figure 1 is an elevation of my wind-screen collapsed. Fig. 2 is a similar view with the screen open. Fig. 3 is a plan view. Figs. 4 and 5 are respectively views of a part of Figs. 1 and 2 enlarged. Fig. 6 is an illustrative view showing the screen applied to the bicycle, and Fig. 7 is a side elevation of the screen.

$a$ is an upright screen-carrying rod adapted to be detachably connected with the frame of the bicycle by a suitable clamp or collar. It may be arranged either in the upper cross-brace, as shown in full line in Fig. 6, or on the head of the machine, as shown in dotted lines.

$d$ is a rod connected with the rod $a$ by links $f f$ and connected by links $c c$ with arms $b$, hinged to the rod $a$. The arms $b$ are arranged on each side of the rod $d$.

$l l$ are wing-like pieces of textile or flexible material forming the body of the screen and are fastened at their inner edges to the rod $a$, while their outer edges are connected with the outer ends of the arms $b$. As shown, the ends of the arms $b$ are forked and engage eyelets or loops on the pieces $l l$.

When the rod $d$ is in a lowered position, it will lie close to the rod $a$, with the arms $b b$ hanging down and the screen collapsed, as shown in Fig. 1; but when the rod $d$ is elevated on the links $f f$ the arms $b b$ will be thrown outward and the screen will be opened, as shown in Fig. 2. If desired, the forked ends of the arms $b b$ may be disengaged by hand from the eyelets of the screen-pieces when the screen is collapsed, as shown in Fig. 1, and may be reëngaged therewith when the screen is opened.

Any suitable means may be employed for moving the rod $d$ and fastening it in an elevated position. For this purpose I have shown a sliding collar $g$ on the rod $a$, connected with the rod $d$ by a link $h$ and held in an elevated position by a spring $k$.

If desired, stay-links $e e$ between the links $c$ and rod $d$ may be used, as shown in Figs. 4 and 5, to afford additional strength and stiffness to the screen.

To avoid the obstruction of the rider's freedom of vision by the screen, it is provided with one or more sight-openings $m$, which may be covered with gauze. When the screen is not required, it may be unclamped from the frame and removed.

What I claim as new, and desire to secure by Letters Patent, is as follows:

1. In a wind-screen for bicycles, &c., the combination of the supporting-rod $a$, the movable rod $d$, links between the rods $a$ and $d$, the hinged expanding arms $b$ links between the rod $d$ and arms $b$, and the flexible screen-pieces $l$ carried by the arms $b$, substantially as and for the purposes described.

2. In a wind-screen for bicycles, &c., the combination of the supporting-rod $a$, the movable rod $d$, links between the rods $a$ and $d$, the hinged expanding arms $b$, links between the rod $d$ and the arms $b$, the movable collar $g$, and a link between the collar and rod $d$.

In testimony whereof I have hereunto set my hand in the presence of two witnesses.

AUGUST ASSMANN.

Witnesses:
JOHN CANNVELICH,
HERMANN BARTICH.